United States Patent
Grumann et al.

(10) Patent No.: US 6,775,825 B1
(45) Date of Patent: Aug. 10, 2004

(54) COMMON SOFTWARE APPLICATION DEFINITION FOR RESOURCE MANAGEMENT

(75) Inventors: Doug Grumann, Citrus Heights, CA (US); Michael Richard Carl, Plano, TX (US); Thomas Edwin Turicchi, Jr., Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 09/703,949

(22) Filed: Oct. 31, 2000

(51) Int. Cl.[7] .............................................. G06F 9/44
(52) U.S. Cl. ...................... 717/127; 717/100; 717/128
(58) Field of Search ............................... 717/100, 106, 717/127, 128

(56) References Cited

U.S. PATENT DOCUMENTS

| | | | | |
|---|---|---|---|---|
| 5,067,107 A | * | 11/1991 | Wade .......................... | 703/21 |
| 5,418,941 A | | 5/1995 | Peters ......................... | 395/575 |
| 5,557,793 A | * | 9/1996 | Koerber ................... | 707/103 R |
| 5,581,755 A | * | 12/1996 | Koerber et al. ......... | 707/103 R |
| 5,644,764 A | * | 7/1997 | Johnson et al. ......... | 707/103 R |
| 5,758,348 A | * | 5/1998 | Neubauer ............... | 707/103 R |
| 5,826,239 A | | 10/1998 | Du et al. ...................... | 705/8 |
| 5,903,753 A | * | 5/1999 | Bramnick et al. .......... | 709/328 |
| 6,016,394 A | * | 1/2000 | Walker ...................... | 717/104 |
| 6,370,681 B1 | * | 4/2002 | Dellarocas et al. ......... | 717/110 |
| 6,467,052 B1 | * | 10/2002 | Kaler et al. .................... | 714/39 |
| 6,571,286 B2 | * | 5/2003 | Fisher et al. ................ | 709/224 |
| 6,571,297 B1 | * | 5/2003 | Cline et al. ................. | 709/328 |
| 6,654,948 B1 | * | 11/2003 | Konuru et al. .............. | 717/127 |
| 6,658,654 B1 | * | 12/2003 | Berry et al. ................ | 717/131 |

OTHER PUBLICATIONS

Shaw, Mary, DeLine, Robert, Klein, Daniel V., Ross, Theodore L., Young, David M., Zelesnik, Gregory, "Abstractions for Software Architecture and Tools to Support Them", Mar. 8, 1995, p. 1–44, CMU, retrieved Jun. 9, 2003 from google.com searc.*

Allen, Robert and Garlan, David, "Formalizing Architectural Connection", May 1994, Proceedings of the 16th International Conference of Software Engineering, p. 1–11, retrieved from google.com search.*

* cited by examiner

*Primary Examiner*—Tuan Dam
*Assistant Examiner*—Mary Steelman

(57) ABSTRACT

A system and method for generating and sharing consistent application definitions amongst multiple performance and resource management tools. A common interface accepts requests from performance or resource management tools and returns requested process-to-application mapping data. A parameters file contains a common syntax for application definitions, and a module uses the parameters file to determine mapping from processes into applications. A performance monitoring tool for senses current system processes' states and provides measurement data to the mapping module.

20 Claims, 4 Drawing Sheets

COMMON SOFTWARE APPLICATION DEFINITION FOR RESOURCE MANAGEMENT

TECHNICAL FIELD

This invention relates to a computer system Application Programming Interface ("API") for generating and sharing common application definitions between multiple performance and resource management tools.

BACKGROUND ART

A number of performance and resource management tools have been developed to assist in administering and optimizing the performance of computer operating systems. In order for such software tools to be useful, they must be aware of the applications that are active in the computing environment that they are monitoring. Existing solutions for monitoring applications on a computer operating system require the administrator to define the applications which are present on the system in a manner specific to that performance or resource management tool used in that solution.

Current schemes for defining applications utilize unique configuration files which group computer system processes by process name, executable file, or other means. However, there exists no consistent approach to such groupings between the different performance and resource management tools currently in use. This lack of consistency forces the user of such tools to generate a configuration of application definitions for each of the different tools, independently of each other.

SUMMARY OF INVENTION

In one respect, what is described is a system for generating and sharing consistent application definitions amongst multiple performance and resource management tools. The described system includes a common interface for accepting requests from performance or resource management tools and returning requested process-to-application mapping data. The system uses a parameters file containing a common syntax for application definitions. A module in the system determines mapping from processes into applications, and a performance monitoring tool senses current system processes' states and provides measurement data to the mapping module.

In another respect, what is described is a method for generating and sharing consistent application definitions amongst multiple performance and resource management tools. The described method includes establishing a set of application definition parameters from which performance and resource management tools can select in order to request performance and resource management data. The requests for information from the performance and resource management tools are accepted by the method. The requests are then processed to generate corresponding process-to-application mapping data, which is then delivered to the requesting performance and resource management tools.

In yet another respect, what is described is a computer readable medium on which is embedded a program. The embedded program includes components used to execute the above method.

Those skilled in the art will appreciate these and other advantages and benefits of various embodiments of the invention upon reading the following detailed description with reference to the below-listed drawings.

DETAILED DESCRIPTION

Figure 1:
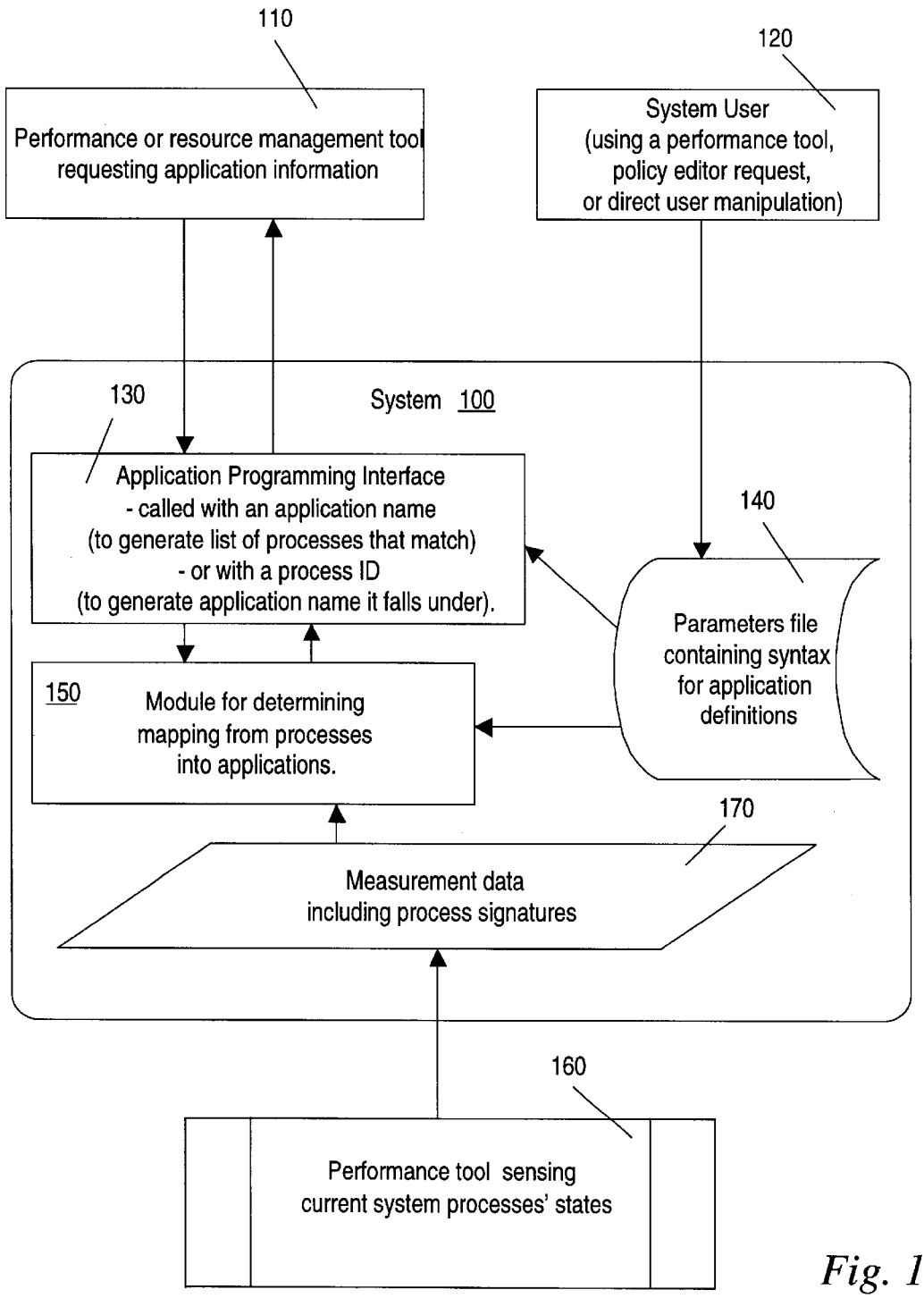
FIG. 1 is a block diagram of a system for generating and sharing consistent application definitions amongst multiple performance and resource management tools according to the present invention.

FIG. 1 is a block diagram showing a system 100 for generating and sharing consistent application definitions amongst multiple performance and resource management tools according to one embodiment of the present invention. In this embodiment, the system 100 includes an Application Programming Interface ("API") operably connected to a module 150 for determining mapping from processes into applications. The module 150 receives input from a parameters file 140 containing a common syntax for application definitions. The system 100 can be implemented with a computer having a processor and a memory storing software modules for execution by the processor.

The common syntax for application definitions contained in the parameters file 140 is a comprehensive set of application definition parameters that any one oaf multitude of performance or resource management tools may call upon for system performance or resource management data. This common syntax permits the present invention to generate and share consistent application definitions.

The performance or resource management tools that may interface with the present invention include Hewlett-Packard's Measure Ware tool, among others. Such tools include software modules that obtain and process realtime data on selected parameters reflecting the status and use of system resources such as central processing unit (CPU) cycles, memory blocks, execution threads, and other measures of system performance. An application definition is thus a set of values associated with selected performance and resource management parameters for a given application active in the system, including the application name, describing the application to the operating system and to any performance or resource management tools accessing the system 100.

In the present invention, the parameters that may be used to derive an application definition for each named application may include one or more of the following:

The execution path. This parameter specifies the executable filename path used to initiate an application instance. All processes started as a result of the invocation of such executable filename become part of the named application. Examples of how this may appear in the parameters file 140 include:

EXEC=/bin/vi, or

EXEC=/opt/langtools/bin

A process name. Running processes with execution names matching this name are considered part of the named application. Partial process names can be specified, and standard string pattern matching allows for "wildcard" process execution binding to the application name. Examples of this parameter in the parameters file 140 include:

PROC=sendmail, or

PROC=ora*

Argument values. Each running process has associated "argv" argument values that specify the values for selected parameters to be passed to the process for use in its processing. For example, each running executable script may have its script name stored in argv[1] even though the process name for all executable scripts would be the same. Examples of this parameter in the parameters file 140 may appear as:

ARGV1=myscript, or

ARGV0=backup, ./mybackup

User name. Active process may be grouped by associated user name identifiers. For example:

USER=root

Scheduling class. Differing highly by computing platform, there are a number of ways to distinguish a process scheduling class. Scheduling classes can include individual process or thread priorities or resource management groups. Examples of how these classes might appear in the parameters file 140 are:

CLASS=(PRI=RealTime), or

CLASS=(PRMID=Other)

Application-provided name. Some applications may provide their own application name by way of instrumentation forms such as ARM ("Application Response Measurement," an industry standard). This information can be obtained when accessing an application- or agent-specific interface. An example of such a parameter in the parameters file 140 is:

APPNAME=Accounting

The system 100 utilizes the common syntax for application definitions contained in the parameters file, implementing these parameters, and any others that may be determined by the user, to map all processes and threads active in a computer system to their associated applications.

The module 150 of the present invention also receives measurement data 170 that includes process state information for the processes and threads active in the computer system. The measurement data 170, which includes data describing the processes and/or threads active in the computer system, is provided to the system 100 by a performance tool 160 that senses the current states of the processes and/or threads active in the computer system.

A system user 120, using a performance or resource management tool, policy editor request, or by direct user manipulation, may connect to the parameters file 140 in order to modify, and thus customize, the parameters file 140. This modification can occur through an input device for the user to enter information into system 100. Furthermore, a performance or resource management tool 110 may connect to the API 130 to request information from the system 100. The API 130 may be called by the performance or resource management tool 110 with an application name or with a process ID, where a process ID is a name or other alphanumeric identifier unique to a specific process capable of running in the computer system being monitored by the system 100. When this input is passed on from the API 130 to the module 150, the module 150 processes the request form the performance or resource management tool 110, utilizing the measurement data 170 and the common syntax for application definitions contained in the parameters file 140.

Upon completion of its processing of the request from the API 130 with the measurement data 170 and the common syntax for application definitions contained in the parameters file 140, the module 150 then returns to the API 130 a list of processes that match a given application if the API 130 was called with an application name. If the API 130 was called with a process ID, the module 150 returns the application name that a process ID falls under. The procedure, method or algorithm for mapping processes to applications and applications to processes is well known in the art. The API 130 then returns to the performance or resource management tool 110 either the list of processes associated with an application or the application name under which a process ID falls, depending on the nature of the request made to the API 130.

Figure 2A:
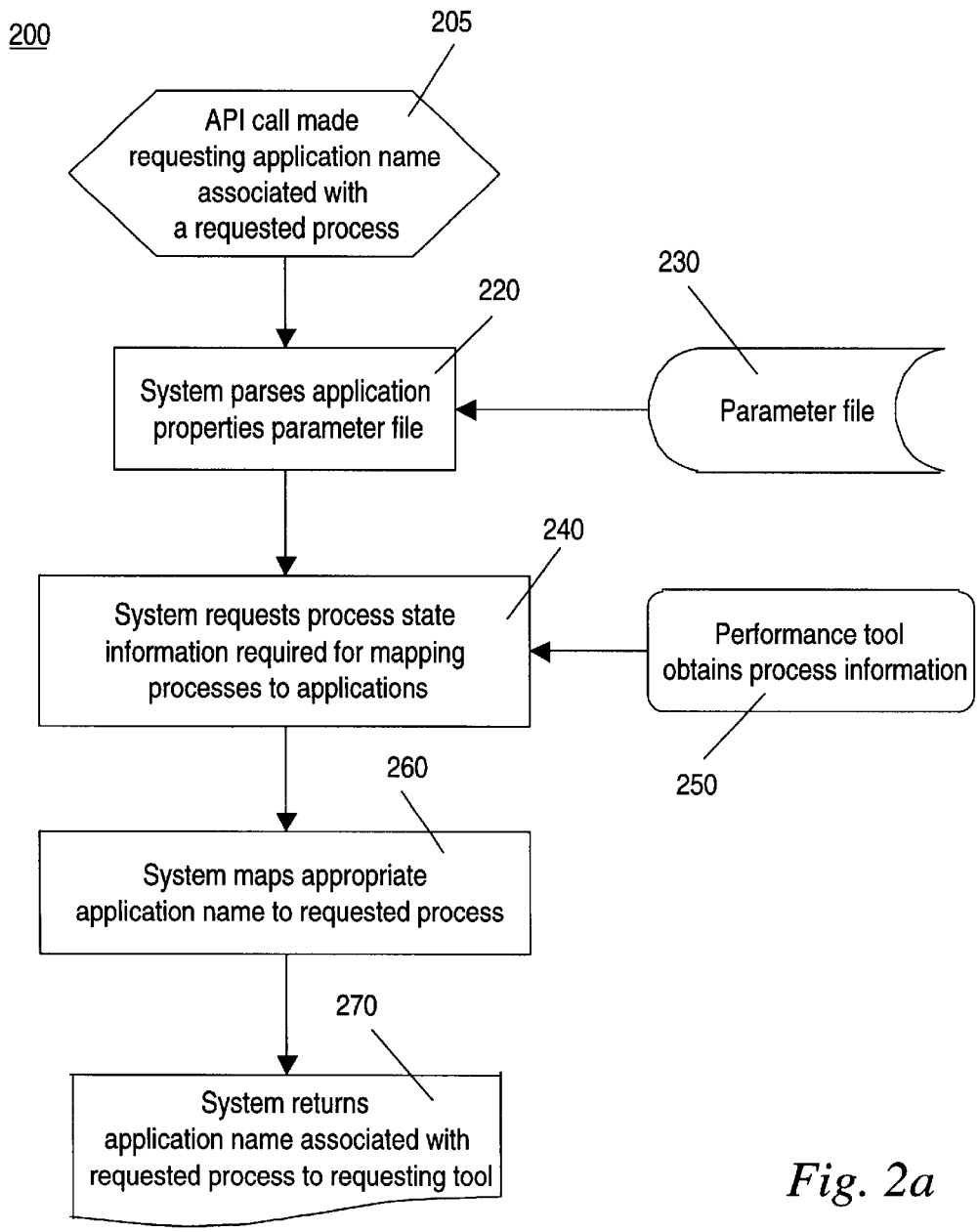
FIG. 2a is a flowchart illustrating one embodiment oaf method, using the system of FIG. 1, for generating and sharing consistent application definitions amongst multiple performance and resource management tools according to the present invention.

FIG. 2a is a flowchart of one embodiment of a method 200 for generating and sharing consistent application definitions amongst multiple performance and resource management tools according to one embodiment of the present invention. In method 200, an API call is made (step 205) to the system 100 requesting an application name associated with a requested process. The method 200 then parses (step 220) the application properties that form the common syntax for application definitions contained in the parameters file 230. Following the input of the parameters file 230, the method 200 requests (step 240) process state information that is required to map processes into applications, obtaining this process information from a designated performance monitoring tool (step 250). The method 200 then processes the common syntax for application definitions contained in the parameters file 230 against the process state information according to a procedure or algorithm well known in the art (step 260) to map the appropriate application name to the requested process. The method 200 then returns the application name associated with the requested process to the requesting performance or resource management tool (step 270).

Figure 2B:
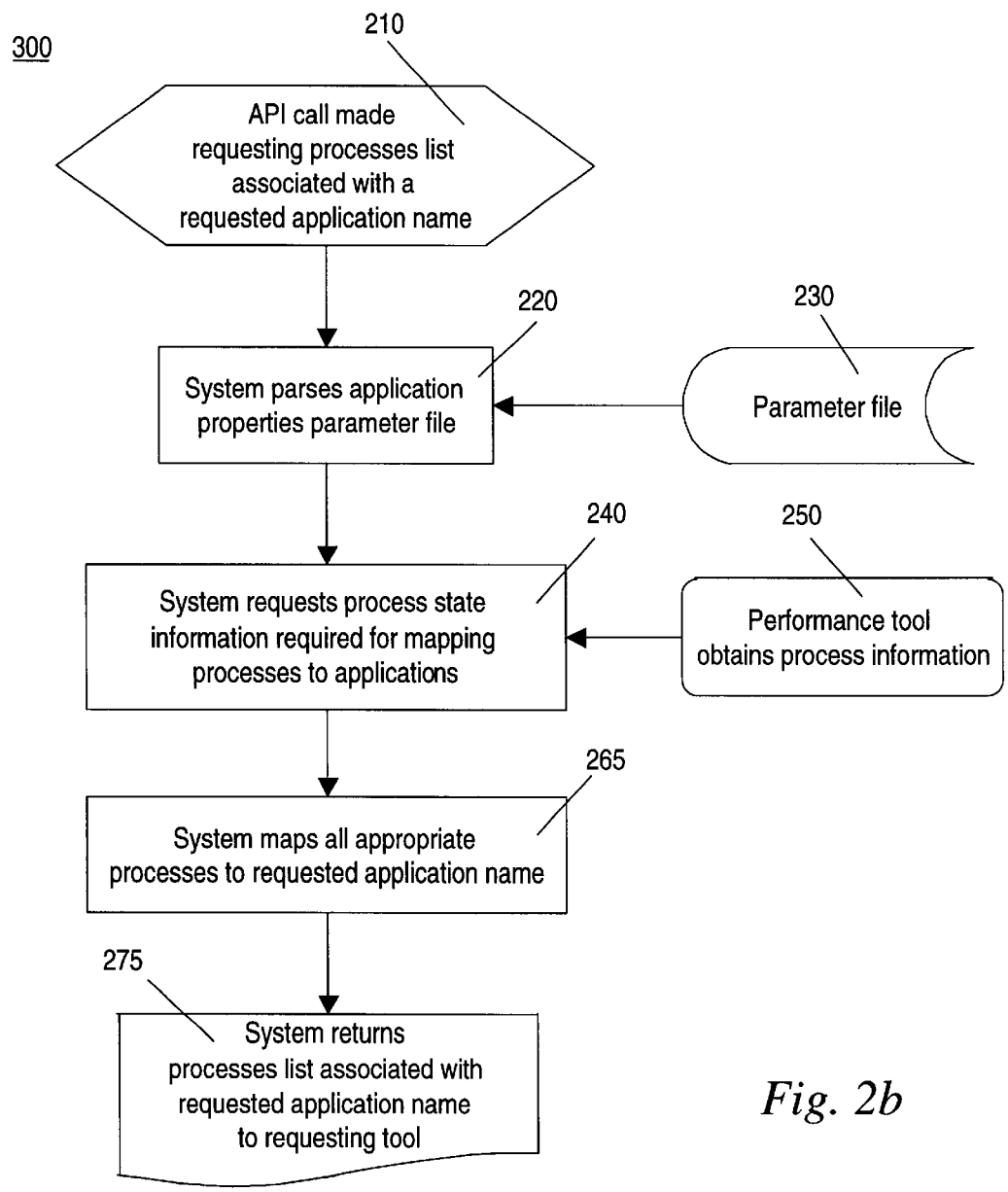
FIG. 2b is a flowchart illustrating a second embodiment of a method, using the system of FIG. 1, for generating and sharing consistent application definitions amongst multiple performance and resource management tools according to the present invention.

FIG. 2b is a flowchart of one embodiment of a method 300 for generating and sharing consistent application definitions amongst multiple performance and resource management tools according to one embodiment of the present invention. In method 300, an API call is made (step 210) to the system 100 requesting a list of processes associated with a requested application name. The method 300 then parses (step 220) the application properties that form the common syntax for application definitions contained in the parameters file 230. Following the input of the parameters file 230, the method 300 requests (step 240) process state information that is required to map processes into applications, obtaining this process information from a designated performance monitoring tool (step 250). The method 300 then processes the common syntax for application definitions contained in the parameters file 230 against the process state information according to a procedure or algorithm well known in the art (step 265) to map the appropriate processes to the requested application name. The method 300 then returns the list of processes associated with the requested application name to the requesting performance or resource management tool (step 275).

Figure 2C:
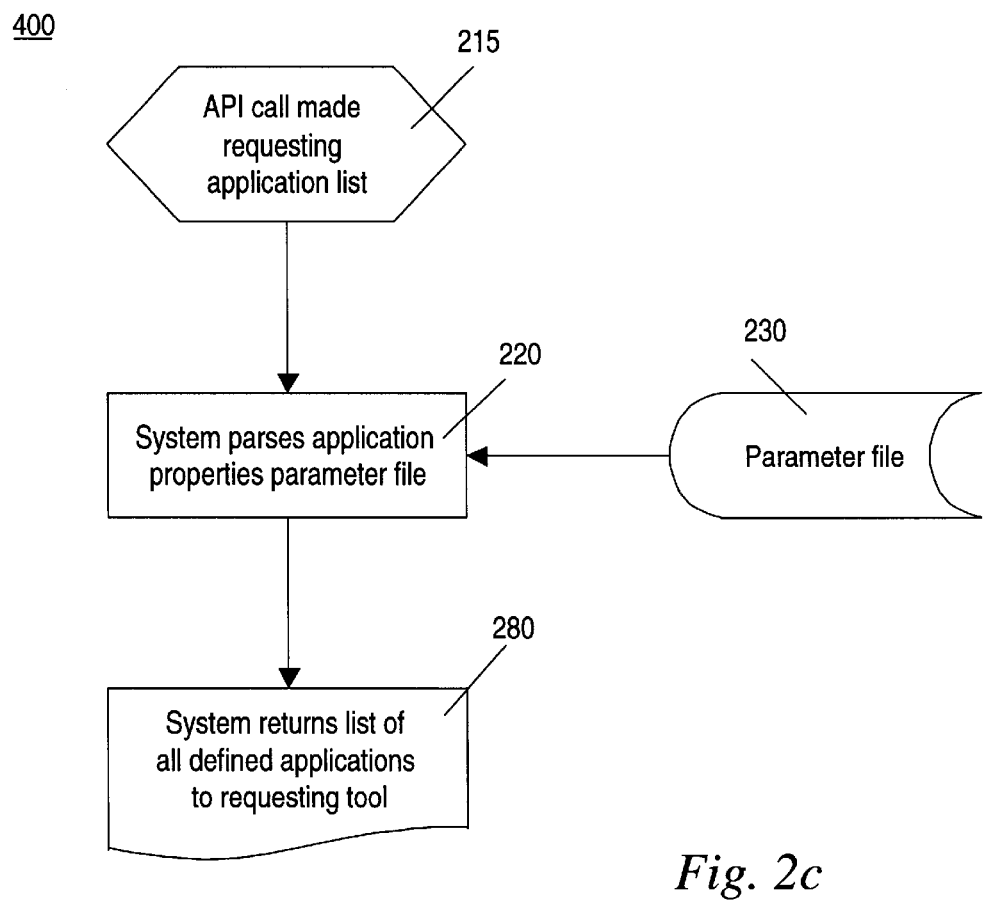
FIG. 2c is a flowchart illustrating a third embodiment of a method, using the system of FIG. 1, for generating and sharing consistent application definitions amongst multiple performance and resource management tools according to the present invention.

FIG. 2c is a flow chart of one embodiment of a method 400 for generating and sharing consistent application definitions amongst multiple performance and resource management tools according to one embodiment of the present invention. In method 400, an API call is made (step 215) to the system 100 requesting a list of all defined applications. The method 400 then parses (step 220) the application properties that form the common syntax for application definitions contained in the parameters file 230. Using the common syntax for application definitions contained in the parameters file 230, the method 400 compiles a listing of all defined applications and returns this listing of all defined applications to the requesting performance or resource management tool (step 280).

The steps of the methods 200, 300 and 400 can be implemented with hardware or by execution of programs, modules or scripts. The programs, modules or scripts can be stored or embodied on one or more computer readable mediums in a variety of formats, such as source code, object code or executable code, for example. The computer readable mediums may include, for example, both storage devices and signals. Exemplary computer readable storage devices include conventional computer system RAM (random access memory), ROM (read only memory), EPROM (ersable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for generating and sharing consistent application definitions amongst multiple performance and resource management tools to independently monitor applications, the method comprising the steps of:
   establishing a set of application definition parameters from which performance and resource management tools can select in order to request performance and resource management data;
   accepting requests for information from the performance and resource management tools;
   processing the requests for the information to generate corresponding process-to-application mapping data, the processing step comprising:
      processing a common syntax for application definitions against process state information to generate the corresponding process-to-application mapping data; and
   delivering the process-to-application mapping data to the requesting performance and resource management tools.

2. The method of claim 1, wherein the performance and resource management tools can modify the common syntax.

3. The method of claim 1 wherein the accepting step comprises receiving process state information from a performance monitoring tool.

4. The method of claim 1, further comprising the performance and resource management tools requesting a list of processes associated with an application name.

5. The method of claim 1, further comprising the performance and resource management tools requesting an application name associated with a specific process.

6. The method of claim 1, further comprising the performance and resource management tools requesting a list of all applications defined in the common syntax for application definitions.

7. The method of claim 1, wherein the processing step further comprises:
   parsing application properties that form the common syntax for the application definitions.

8. The method of claim 7, wherein the processing step further comprises:
   requesting the process state information that is required to map processes into applications, wherein the process state information is obtained from a designated performance monitoring tool.

9. A system for generating and sharing consistent application definitions amongst multiple performance and resource management tools to independently monitor applications, comprising:
   a common interface for accepting requests from performance or resource management tools and returning requested process-to-application mapping data;
   a parameters file containing a common syntax for application definitions;
   a mapping module for determining mapping from processes into applications using the parameters file; and
   a performance monitoring tool for sensing current system processes' states and providing measurement data to the mapping modules,
   wherein the mapping module processes the common syntax for the application definitions against the measurement data to generate corresponding process-to-application mapping data.

10. The system of claim 9, wherein the measurement data includes process state information.

11. The system of claim 9, further comprising:
   one or more performance or resource management tools for requesting process and application information; and
   a module for manipulation of the parameters file by the performance or resource management tools.

12. The system of claim 9, further comprising a module for user manipulation of the parameters file containing the common syntax for application definitions.

13. The system of claim 9, wherein the mapping module parses application properties that form the common syntax for the application definitions.

14. A computer readable medium on which is embedded a program, the program comprising instructions for performing a method to generate and share consistent application definitions amongst multiple performance and resource management tools to independently monitor applications, the method comprising the steps of:
   establishing a set of application definition parameters from which performance and resource management tools can select in order to request performance and resource management data;
   accepting requests for information from the performance and resource management tools;
   processing the requests for the information to generate corresponding process-to-application mapping data, the processing step comprising:
      processing a common syntax for application definitions against process state information to generate the corresponding process-to-application mapping data; and
   delivering the process-to-application mapping data to the requesting performance and resource management tools.

15. The computer readable medium of claim 14, wherein the performance and resource management tools can modify the common syntax.

16. The computer readable medium of claim 14 wherein the accepting step comprises receiving process state information from a performance monitoring tool.

17. The computer readable medium of claim 14, further comprising the performance and resource management tools requesting a list of processes associated with an application name.

18. The computer readable medium of claim 14, further comprising the performance and resource management tools requesting an application name associated with a specific process.

19. The computer readable medium of claim 14, further comprising the performance and resource management tools requesting a list of all applications defined in the common syntax for application definitions.

20. The computer readable medium of claim 14, wherein the processing step further comprises:
- parsing application properties that form the common syntax for the application definitions; and
- requesting the process state information that is required to map processes into applications, wherein the process state information is obtained from a designated performance monitoring tool.

* * * * *